(12) United States Patent
Kreuzer

(10) Patent No.: US 11,714,018 B2
(45) Date of Patent: Aug. 1, 2023

(54) DEVICE FOR RECEIVING AND CLAMPING A ROTOR BEARING AND BALANCING MACHINE COMPRISING SUCH A DEVICE

(71) Applicant: Schenck RoTec GmbH, Darmstadt (DE)

(72) Inventor: Sebastian Kreuzer, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 17/666,102

(22) Filed: Feb. 7, 2022

(65) Prior Publication Data

US 2022/0260447 A1 Aug. 18, 2022

(30) Foreign Application Priority Data

Feb. 18, 2021 (DE) ...................... 10 2021 103 901.0

(51) Int. Cl.
*G01M 1/02* (2006.01)
*G01M 1/30* (2006.01)

(52) U.S. Cl.
CPC ................ *G01M 1/02* (2013.01); *G01M 1/30* (2013.01)

(58) Field of Classification Search
CPC ............ G01M 1/02; G01M 1/04; G01M 1/14; G01M 1/30; B25B 5/02; B25B 5/04; B25B 5/061; B25B 5/147; B25B 11/00; B25H 1/0007
See application file for complete search history.

(56) References Cited

U.S. PATENT DOCUMENTS

| | | | |
|---|---|---|---|
| 2,123,443 A | 7/1938 | Taylor | |
| 3,090,237 A | 5/1963 | Ongaro | |
| 3,754,801 A * | 8/1973 | Giers | G01M 1/04 384/428 |
| 7,412,884 B2 | 8/2008 | Feldmann et al. | |
| 10,295,428 B2 | 5/2019 | Baehr et al. | |
| 2018/0117719 A1* | 5/2018 | Muth | B23K 37/0533 |

FOREIGN PATENT DOCUMENTS

| | | |
|---|---|---|
| DE | 103 16 767 A1 | 10/2004 |
| DE | 10 2014 106 334 A1 | 11/2015 |
| DE | 10 2016 208 527 A1 | 11/2017 |
| DE | 102016208527 A1 * | 11/2017 |
| EP | 0 803 720 A2 | 10/1997 |
| GB | 2070489 A * | 9/1981 ....... B23B 31/16287 |

* cited by examiner

*Primary Examiner* — David P Bryant
*Assistant Examiner* — Christine Bersabal
(74) *Attorney, Agent, or Firm* — Collard & Roe, P.C.

(57) ABSTRACT

A device (1) for receiving and clamping a rotor bearing (6) is provided with at least one bearing block (2) lying transversely to a bearing axis of the rotor bearing (6), a bearing element (4) designed to receive the rotor bearing (6), a clamping arm (12), and a locking device (9). The clamping arm (12) has an engagement element (8) by means of which it can be brought into engagement with the rotor bearing (6). The locking device (9) also comprises at least two engagement elements (8) which are radially movable in the bearing element (4) and can be introduced into radial receptacles (14) in the rotor bearing (6) by actuating the locking device (9), such that a rotor bearing (6) which can be received by the bearing element (4) can be clamped by the engagement elements (8) of the clamping arm (12) and the locking device (9).

10 Claims, 2 Drawing Sheets

DEVICE FOR RECEIVING AND CLAMPING A ROTOR BEARING AND BALANCING MACHINE COMPRISING SUCH A DEVICE

CROSS REFERENCE TO RELATED APPLICATIONS

Applicants claim priority under 35 U.S.C. § 119 of German Patent Application No. 10 2021 103 901.0 filed Feb. 18, 2021.

FIELD OF THE INVENTION

The invention relates to a device for receiving and clamping a rotor bearing, the device comprising at least one bearing block lying transversely to a bearing axis of the rotor bearing, and a bearing element designed to receive the rotor bearing. The invention also relates to a balancing machine comprising a clamping device of this kind.

BACKGROUND OF THE INVENTION

Balancing machines are used to measure and compensate for the unbalance of rotors and are usually used for various rotors that differ from one another in terms of diameter and the axial position of their bearings. A typical example thereof is crankshafts intended for different engines, which crankshafts can have different main bearing diameters, different pitches and different lengths. In order to precisely compensate for an existing unbalance, the relevant rotor has to be mounted on its bearing surfaces in a position centered on the bearing axis of the balancing machine. It is received by bearing elements of a bearing apparatus, and the bearing elements have to be adapted to the diameter of each rotor bearing in order to exactly center the rotor. The rotors are clamped by corresponding clamping devices in which the rotor bearing is held, for example, by clamping bolts that engage in receptacles in the rotor bearing. The clamping bolts usually have to be inserted and removed manually.

EP 0 803 720 A2 discloses an unbalance measuring station for determining the unbalance of rotors that have a plurality of bearing points, which station comprises bearing apparatuses supported on an oscillating bridge for rotatably mounting the rotor.

U.S. Pat. No. 3,090,237 discloses an apparatus for balancing rotors, in which two bearing stands can be fastened to any point along a machine extending in the axial direction.

An imbalance measuring apparatus known from DE 103 16 767 A1, in order to receive rotor circumferential portions, has a bearing apparatus comprising open fluid-supplied bearing shells and fluid-supplied bearing plates assigned to the rotor end faces. In order to adapt to different types of rotors, the bearing shells and the bearing plates are interchangeably fastened to supports which are arranged on a bearing bridge.

The problem with these known rotor mounts is that the rotor bearing is usually clamped manually by holding the bearing in its position by means of bolts. The bolts can change position, which in turn results in an insecure rotor bearing.

The aim of the invention is that of providing a reproducible, secure and fast rotor bearing clamping device.

The aim is achieved by providing a device for receiving and clamping a rotor bearing being provided, the device comprising at least one bearing block lying transversely to a bearing axis of the rotor bearing, a bearing element designed to receive the rotor bearing, a clamping arm, and a locking device, wherein the clamping arm has an engagement element by means of which it can be brought into engagement with the rotor bearing and wherein the locking device comprises at least two engagement elements which are radially movable in the bearing element and can be introduced into radial receptacles in the rotor bearing by actuating the locking device, such that a rotor bearing which can be received by the bearing element can be clamped by the engagement elements of the clamping arm and the locking device. By actuating the locking device, it is possible to clamp and release the rotor bearing easily and in a controlled manner. Stable and secure clamping is achieved, which can also be automated. It is also possible to manually actuate the locking device in a reproducible manner. As a result, the errors that occur when manually inserting the bolts into a clamping device can be avoided, such as non-reproducible positioning of the bolts, slipping of the bolts, etc.

In one embodiment, the device can comprise two separate locking devices each comprising an engagement element, which engagement elements are radially movable in the bearing element and can be introduced into radial receptacles in the rotor bearing by actuating the locking devices, such that a rotor bearing which can be received by the bearing element can be clamped by the engagement elements of the clamping arm and the locking devices.

The clamping arm can be movable and can be pivoted from a loading position, in which the bearing element is accessible for receiving the rotor bearing, into a clamping position, in which it can be brought into engagement with the received rotor bearing. In order to allow the bearing block to be easily loaded, the clamping arm can be movably, for example pivotally, attached to the device. After loading, the clamping arm can be moved back into the clamping position in which it can be brought into engagement with the rotor bearing.

In order to establish an operative connection between the clamping arm and the rotor bearing, the engagement element of the clamping arm can be movably mounted in the clamping arm and can be moved from an unlocking position into a locking position in which it can be brought into engagement with a receptacle in the rotor bearing. The engagement element can be present, for example, as a bolt in a bore extending in the clamping arm and can be coupled to an electromotive unit such as a motor, such that the bolt can be automatically or manually brought from an unlocking position into a locking position in which it can be brought into engagement with a receptacle in the rotor bearing.

In one embodiment, the engagement element of the clamping arm is provided as a fixed bolt formed on a head part of the clamping arm. The clamping arm can have a head part on which a fixed engagement element, for example designed as a bolt, is formed. After the device has been loaded, the clamping arm can be moved from the loading position into the clamping position in which the engagement element interacts with a receptacle in the rotor bearing.

The device according to the invention has in particular a locking device which moves at least two engagement elements, the locking device in one embodiment comprising one actuator or a plurality of actuators. In this embodiment, one actuator moves one engagement element or a plurality of engagement elements. However, the device can also have two locking devices, each comprising an actuator which is operatively connected to an engagement element and which causes a radial movement of the engagement elements when actuated. The locking devices and the actuators can be controlled synchronously or asynchronously via a control unit, such that the movement of the engagement elements can, but does not have to, take place in a temporally synchronous manner. An actuator is in particular a drive component that converts an electrical signal into mechanical movement and can be designed, for example, as an electromechanical lifting cylinder that is operatively connected to the engagement element or engagement elements via a linkage comprising joints and causes a linear movement of the engagement elements.

The invention also relates to a balancing machine for determining and compensating for an unbalance of a rotor, the balancing machine comprising at least one device for receiving and clamping a rotor bearing as described above. The embodiments and advantages mentioned above can also be applied to the design and advantages of the balancing machine.

In order to ensure that the device can be adjusted, it can be advantageous for the device for receiving and clamping a rotor bearing to be arranged on a machine frame such that it can be displaced along the rotor bearing axis. For this purpose, the device can be arranged, for example, on a carriage which can be displaced on the machine frame. This allows the device to be moved along the rotor bearing axis.

In addition, a lateral movement of the device can be advantageous, which lateral movement can be achieved, for example, as a result of the device for receiving and clamping a rotor bearing being arranged on a machine frame such that it can be displaced transversely to the rotor bearing axis. In this case, the device can be fastened on a further carriage which, in addition or as an alternative to the longitudinal movement of the device, allows a movement transverse to the longitudinal axis of the rotor.

BRIEF DESCRIPTION OF THE DRAWING

The invention will be explained in more detail with reference to embodiments of the invention, which are illustrated in the drawings, in which.

DETAILED DESCRIPTION OF THE DRAWINGS

Figure 1:
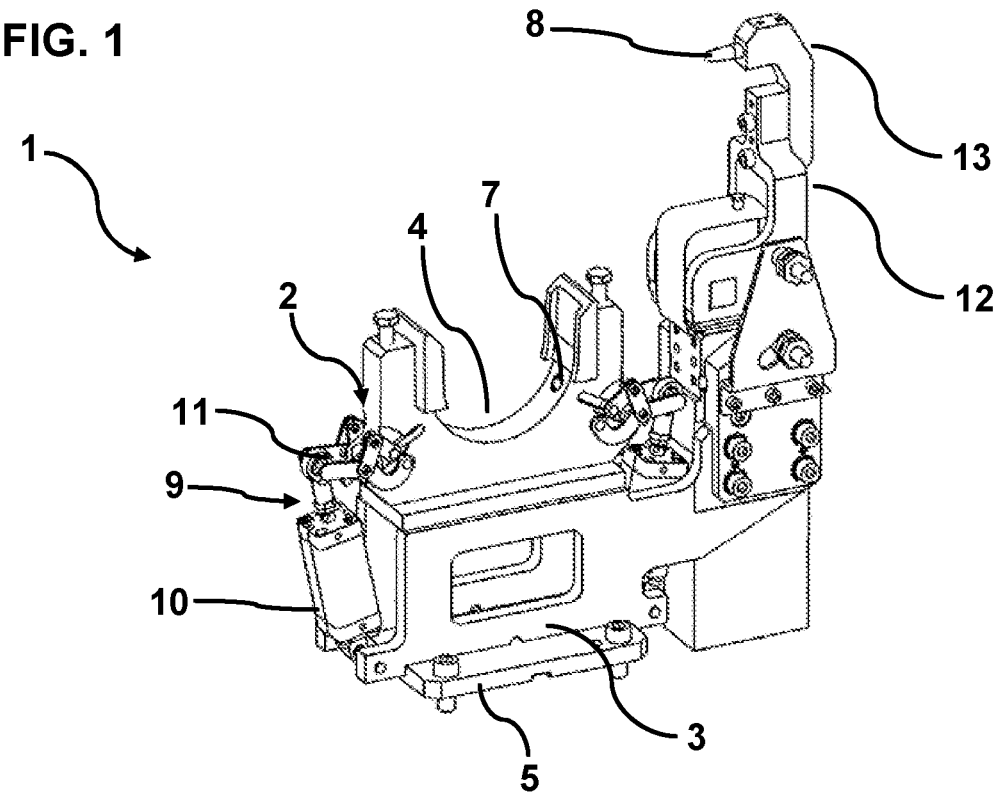
FIG. 1 shows an embodiment of a device in an open position.
Figure 2:
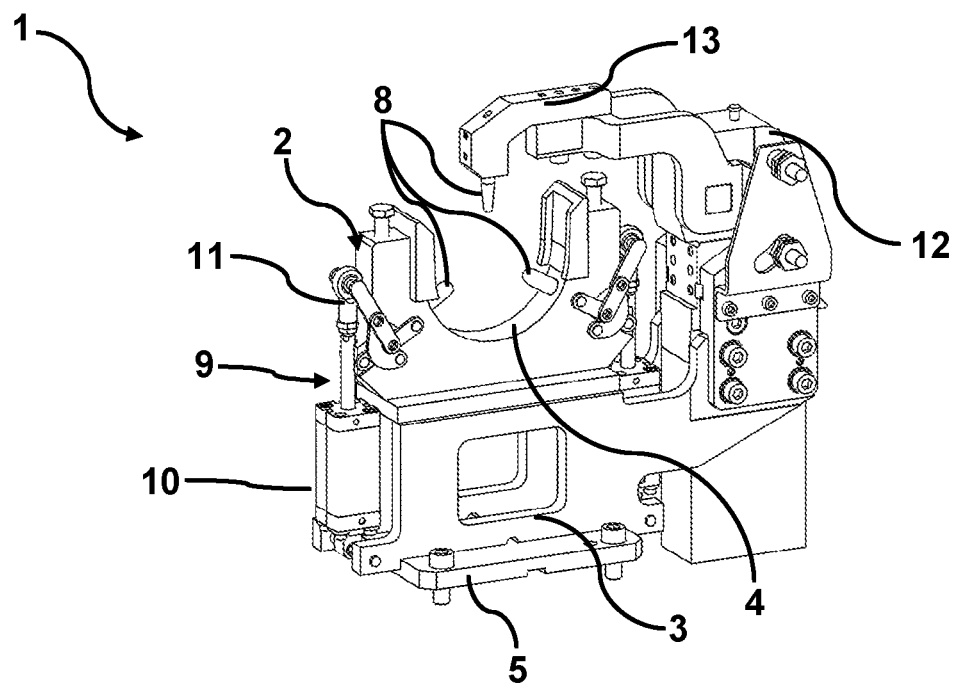
FIG. 2 shows an embodiment of a device in a closed position.

FIG. 1 shows an embodiment of a device for receiving and clamping a rotor bearing in an open loading position, and FIG. 2 shows an embodiment of a device in a closed clamping position. The device 1 comprises a bearing block 2 supported by a base element 3. The bearing block 2 carries a bearing element 4 which is reversibly or irreversibly connected to the bearing block 2. On its underside, the base element 3 can have a planar connecting part 5 by means of which the base element 3 can be fastened to a machine frame of a balancing machine. The base element 3 can also be connected, via said connecting part, to a movably mounted carriage which allows the bearing block 2 to move in various ways.

The bearing element 4 is designed as a semi-circular or open semi-cylindrical bearing shell which is provided for receiving and mounting a rotor bearing 6 (shown in FIG. 3) in a horizontal axial direction. Adaptation means and means for inserting the rotor bearing 6 can be provided in the bearing shell, which means simplify the insertion of differently designed rotor bearings. The bearing shell has at least two radially extending bores 7, in particular through-bores, in each of which a bolt can move radially as an engagement element 8. The engagement element 8 can be rod-shaped and have a pointed, rounded or flat free end. The engagement element 8 is part of or connected to a locking device 9 which can be fastened to the bearing block 2 or the base element 3. The locking device 9 comprises an actuator 10 which, in the embodiment shown, is designed as an electromechanical lifting cylinder. The locking device 9 can also have joints and linkages 11. In the embodiment shown, the piston of the lifting cylinder is operatively connected to the engagement element 8, in particular the bolt, via joints and the movable linkage 11, with a locking device 9 or an actuator 10 being connected to each bolt 8. However, it is also possible for the two engagement elements 8, in particular bolts, to be actuated via an actuator 10. The movement of the actuator 10 can be automatically controlled via a control device (not shown). Together with the corresponding hardware and software, the control device can be part of a balancing machine (not shown). Sensors can also be provided which detect the position of the actuator or the engagement elements 8 and transmit said position to an evaluation unit connected to the control device.

Actuating the locking device 9 leads to a lifting movement of the actuator 10 and a change in position or movement of the linkage 11, which in turn results in a radial movement of the engagement element 8. The locking device 9 can also be designed in such a way that the linear movement of the engagement elements 8 is achieved by means of an electric motor, e.g. by a linear motor or the like.

A clamping arm 12 is also fastened to the base element 3, which clamping arm is designed to be movable, in particular pivotable, in the embodiment shown. The movement of the clamping arm 12 can also be automatically controlled via a control device (not shown). However, it can also be advantageous for the clamping arm 12 to be moved manually. The clamping arm 12 can be reversibly locked in its maximum deflections. At its free end, the clamping arm 12 has a head part which is designed as a clamping head 13 and is connected to the clamping arm 12 via fastening means or latching or plug-in connections. The clamping head 13 has an engagement element 8 which is aligned toward the bearing element 4 and which, in the embodiment shown, is designed as a bolt. The end position of the engagement element 8 of the clamping head 13 can be adjusted via adjustment means. Furthermore, the height of the clamping arm 12 can be adjustable, i.e. the clamping arm can be vertically adjustable.

The device 1 according to the invention is present in a loading position and in a clamping position; the loading position is shown in FIG. 1 and the clamping position is shown in FIG. 2. It is characteristic of the loading position that the bearing element 4 is accessible for receiving a rotor bearing 6. In order to simplify introducing the rotor bearing 6 into the bearing element 4, it can be advantageous for the engagement elements 8 to be inserted into the bearing element 4, i.e. into the bores 7 made in the bearing element 4. That means that the bolts are countersunk in the bearing shell. The same applies to the clamping arm 12 which, in the loading position, is in a position in which the bearing element 4 is accessible for a rotor bearing 6.

In one embodiment of the device 1, it is not possible to pivot the entire clamping arm 12, and instead only the clamping head 13 is movable. In this case, for example, the clamping head 13 can be moved in such a way that it is at a 90° angle with respect to the longitudinal axis of the clamping arm 12. Moreover, the engagement element 8 of the clamping arm 12 or the clamping head 13 is movable, such that it can be moved from an unlocking position into a locking position in which it can be brought into engagement with the rotor bearing 6 inserted in the bearing element.

Figure 3:
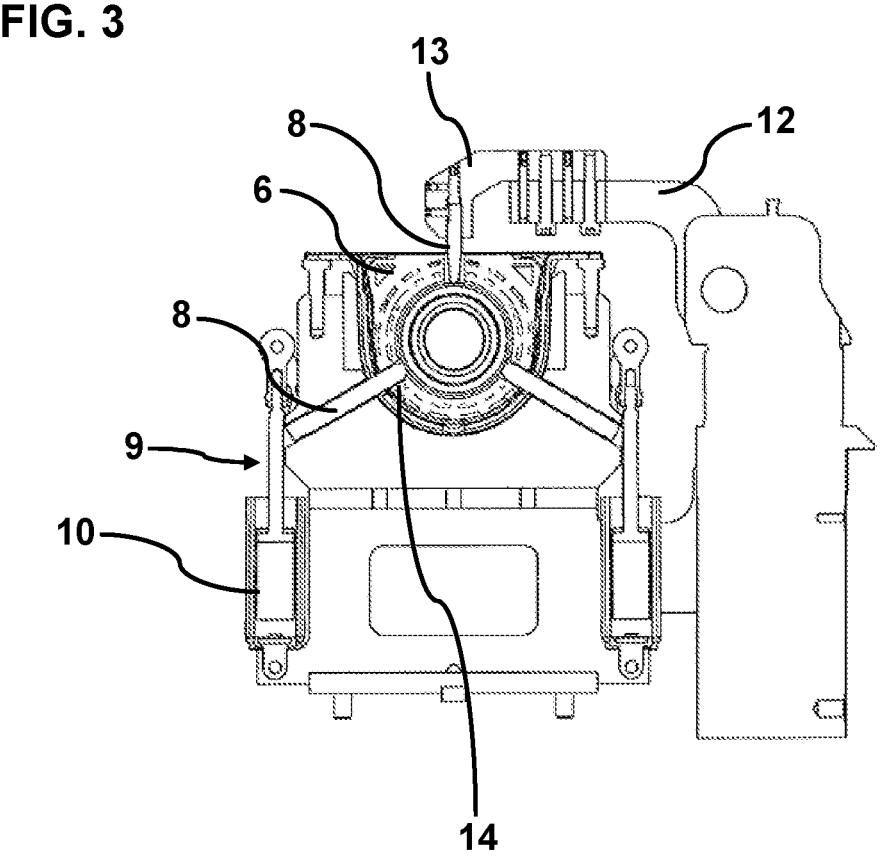
FIG. 3 shows an embodiment of a device together with a clamped rotor bearing.

FIG. 3 shows an embodiment of a device 1 together with a clamped rotor bearing 6. The rotor bearing 6 to be clamped has at least two, preferably three, receptacles 14 for engagement elements 8. The receptacles 14 extend radially in the rotor bearing 6. The rotor bearing 6 to be clamped is inserted into the bearing shell of the bearing element 4, which bearing shell is preferably in the loading position in which the engagement elements 8 are retracted and the clamping arm 12 is in the loading position in which the bearing shell is accessible. The rotor bearing 6 can have centering means that simplify inserting the rotor bearing 6 in the correct position in which the receptacles 14 are concentric with respect to the bores 7 of the bearing element 4. As soon as the rotor bearing 6 is in the correct position, the locking device 9 is actuated such that the engagement elements 8 designed as bolts are moved radially into the receptacles 14 of the rotor bearing 6 by a movement of the actuator 10. The clamping arm 12 is also pivoted from the loading position into the clamping position in which its engagement element 8, in particular a bolt, comes into engagement with a correspondingly aligned receptacle 14 in the rotor bearing 6.

In one embodiment, the actuation of the locking device 9 and the movement of the clamping arm 12 can take place simultaneously and in particular automatically. However, it is also possible for these to be carried out one after the other. The movements can also be coordinated with one another, by the movement of the clamping arm 12 from its loading position into its clamping position automatically triggering the actuation of the locking device 9 and causing the rotor bearing 6 to be clamped, for example. The geometric shape of the bolts, i.e. the engagement elements 8, is adapted to the receptacles 14 in the rotor bearing 6, in particular with regard to their length and diameter. Universal fit engagement elements 8 can be provided, which can be inserted into a wide variety of rotor receptacles. In order to support secure clamping of the rotor bearing 6, the locking device 9 can mechanically lock in the clamping position in which the engagement elements 8 engage in the receptacles 14 of the rotor bearing 6. This prevents the locking device 9 and the engagement elements from disengaging unintentionally, and therefore prevents the rotor bearing 6 from being released.

What is claimed is:

1. A device for receiving and clamping a rotor bearing, the device comprising:
   at least one bearing block lying transversely to a bearing axis of the rotor bearing,
   a bearing element designed to receive the rotor bearing,
   a clamping arm, and
   a locking device,
   wherein the clamping arm has an engagement element by means of which it can be brought into engagement with the rotor bearing,
   wherein the locking device comprises at least two engagement elements which are radially movable in the bearing element and can be introduced into radial receptacles in the rotor bearing by actuating the locking device, such that a rotor bearing which can be received by the bearing element can be clamped by the engagement elements of the clamping arm and the locking device, and
   wherein the clamping arm is movable and can be pivoted from a loading position, in which the bearing element is accessible for receiving the rotor bearing, into a clamping position, in which it can be brought into engagement with the received rotor bearing.

2. The device according to claim 1, wherein the engagement element of the clamping arm is movably mounted in the clamping arm and can be moved from an unlocking position into a locking position in which it can be brought into engagement with a receptacle in the rotor bearing.

3. The device according to claim 1, wherein the engagement element of the clamping arm is provided as a fixed bolt formed on a head part of the clamping arm.

4. The device according to claim 1, wherein the bearing element is designed as a semi-circular bearing shell.

5. The device according to claim 1, wherein bores are present in the bearing element, which bores extend radially and accommodate the engagement elements of the locking device.

6. The device according to claim 1, wherein the device has two locking devices, each comprising an actuator which is operatively connected to an engagement element and which causes a radial movement of the engagement elements when actuated.

7. A balancing machine for determining and compensating for an unbalance of a rotor, the balancing machine comprising at least one device for receiving and clamping a rotor bearing, the device for receiving and clamping the rotor bearing comprising:
   at least one bearing block lying transversely to a bearing axis of the rotor bearing,
   a bearing element designed to receive the rotor bearing,
   a clamping arm, and
   a locking device,
   wherein the clamping arm has an engagement element by means of which the clamping arm can be brought into engagement with the rotor bearing,
   wherein the locking device comprises at least two engagement elements which are radially movable in the bearing element and can be introduced into radial receptacles in the rotor bearing by actuating the locking device, such that a rotor bearing which can be received by the bearing element can be clamped by the engagement elements of the clamping arm and the locking device, and
   wherein the clamping arm is movable and can be pivoted from a loading position, in which the bearing element is accessible for receiving the rotor bearing, into a clamping position, in which the clamping arm can be brought into engagement with the received rotor bearing.

8. The balancing machine according to claim 7, wherein the device for receiving and clamping a rotor bearing is arranged on a machine frame such that it can be displaced along a rotor bearing axis.

9. The balancing machine according to claim 7, wherein the device for receiving and clamping a rotor bearing is arranged on a machine frame such that it can be displaced transversely to the rotor bearing axis.

10. The balancing machine according to claim 8, wherein the device for receiving and clamping a rotor bearing is arranged on a machine frame such that it can be displaced transversely to the rotor bearing axis.

* * * * *